United States Patent
Clute

(10) Patent No.: US 7,806,357 B2
(45) Date of Patent: *Oct. 5, 2010

(54) RETRACTOR PRETENSIONER WITH CLUTCH

(75) Inventor: Gunter K. Clute, Bloomfield Hills, MI (US)

(73) Assignee: Autoliv ASP, Inc, Ogden, UT (US)

( * ) Notice: Subject to any disclaimer, the term of this patent is extended or adjusted under 35 U.S.C. 154(b) by 955 days.

This patent is subject to a terminal disclaimer.

(21) Appl. No.: 11/483,271

(22) Filed: Jul. 7, 2006

(65) Prior Publication Data

US 2008/0006731 A1 Jan. 10, 2008

(51) Int. Cl.
*B65H 75/48* (2006.01)
(52) U.S. Cl. ............... 242/374; 242/379.1; 242/382
(58) Field of Classification Search ............ 242/374, 242/379.1, 390, 390.8, 390.9, 394, 394.1, 242/382; 280/805, 806, 807; 297/472, 476, 297/477, 478
See application file for complete search history.

(56) References Cited

U.S. PATENT DOCUMENTS

| | | | |
|---|---|---|---|
| 5,244,231 A | 9/1993 | Bauer et al. | |
| 5,344,095 A | 9/1994 | Frei | |
| 5,415,431 A | 5/1995 | Omura | |
| 5,522,564 A | 6/1996 | Schmidt et al. | |
| 5,526,996 A | 6/1996 | Ebner et al. | |
| 5,607,118 A | 3/1997 | Dybro et al. | |
| 5,788,281 A | 8/1998 | Yanagi et al. | |
| 5,881,962 A | 3/1999 | Schmidt et al. | |
| 5,906,327 A * | 5/1999 | Chamings | 242/374 |
| 5,924,641 A | 7/1999 | Keller et al. | |
| 5,938,135 A | 8/1999 | Sasaki et al. | |
| 6,012,667 A * | 1/2000 | Clancy et al. | 242/379.1 |
| 6,105,894 A | 8/2000 | Singer et al. | |
| 6,241,172 B1 | 6/2001 | Fugel et al. | |
| 6,416,006 B1 | 7/2002 | Huber | |
| 6,416,007 B1 | 7/2002 | Stegmeier | |
| 6,443,380 B1 | 9/2002 | Biller et al. | |
| 6,592,064 B2 | 7/2003 | Clute et al. | |
| 6,616,081 B1 | 9/2003 | Clute et al. | |
| 6,616,186 B1 | 9/2003 | Midorikawa et al. | |
| 6,626,463 B1 | 9/2003 | Arima et al. | |
| 6,641,075 B2 | 11/2003 | Specht | |
| 6,648,260 B2 | 11/2003 | Webber et al. | |
| 6,655,743 B1 | 12/2003 | Parizat et al. | |
| 6,659,505 B1 | 12/2003 | Knox | |
| 6,659,549 B1 | 12/2003 | Still et al. | |
| 6,698,677 B1 | 3/2004 | Happ et al. | |
| 6,702,326 B1 | 3/2004 | Fujii | |
| 6,719,325 B2 | 4/2004 | Ingemarsson | |
| 6,726,250 B2 | 4/2004 | Ennerdal | |
| 6,729,649 B1 | 5/2004 | Schmidt | |

(Continued)

FOREIGN PATENT DOCUMENTS

DE 10122910 B4 10/2004

(Continued)

*Primary Examiner*—Sang Kim
(74) *Attorney, Agent, or Firm*—Sally J Brown; Brinks Hofer Gilson & Lione

(57) ABSTRACT

A retractor includes a pretensioner whereby load limitation disturbances are minimized or eliminated to provide a synchronized and smooth transition between the different structures resisting the rotation of the spool.

19 Claims, 4 Drawing Sheets

U.S. PATENT DOCUMENTS

| | | | |
|---|---|---|---|
| 6,729,693 B2 | 5/2004 | Soderstrom et al. | |
| 6,749,225 B1 | 6/2004 | Clute et al. | |
| 6,786,294 B2 | 9/2004 | Specht | |
| 6,969,089 B2 * | 11/2005 | Klingauf et al. | 280/805 |
| 7,273,191 B2 | 9/2007 | Clute et al. | |
| 7,290,730 B2 * | 11/2007 | Nagata et al. | 242/374 |
| 7,318,560 B2 | 1/2008 | Clute | |
| 7,318,607 B2 * | 1/2008 | Clute | 280/806 |
| 7,354,014 B2 | 4/2008 | Hiramatsu | |
| 7,360,795 B2 | 4/2008 | Zelmer et al. | |
| 7,374,122 B2 | 5/2008 | Bell et al. | |
| 7,410,113 B2 | 8/2008 | Keller et al. | |
| 7,429,012 B2 | 9/2008 | Loffler et al. | |
| 7,458,534 B2 * | 12/2008 | Pech et al. | 242/374 |
| 7,581,757 B2 * | 9/2009 | Clute | 280/806 |
| 2001/0008262 A1 | 7/2001 | Huber | |
| 2002/0166914 A1 | 11/2002 | Specht | |
| 2004/0021029 A1 | 2/2004 | Eberle et al. | |
| 2006/0082127 A1 | 4/2006 | Clute | |
| 2006/0243843 A1 * | 11/2006 | Clute | 242/374 |

FOREIGN PATENT DOCUMENTS

| | | |
|---|---|---|
| EP | 1415872 A1 | 6/2004 |
| WO | WO 03/082640 A1 | 10/2003 |
| WO | WO 2004/065181 A1 | 5/2004 |

* cited by examiner

RETRACTOR PRETENSIONER WITH CLUTCH

FIELD OF THE INVENTION

The present invention relates generally to seat belt restraint apparatus for restraining an occupant of an automobile, and more particularly relates to a retractor having a pretensioner and a clutch mechanism for decoupling the pretensioner.

BACKGROUND OF THE INVENTION

Seat belt restraint systems for automobiles often include a pretensioner that is structured to apply tension to the seat belt when an impact event such as an accident situation is detected. When the pretensioner is activated, the pretensioner eliminates any slack in the seat belt, and thus controls the physical space between the occupant and the seat belt. In this manner, the occupant of the seat is coupled with the seat belt as the occupant initially moves forward relative to the seat, thereby controllably restraining the occupant, reducing occupant excursion, and preventing undue loads when the occupant moves forwardly into the seat belt.

A retractor is another standard component of a seat belt restraint system that includes a spool receiving the webbing material of the seat belt. The spool is used to wind up and store the webbing. Generally, the spool is locked in place by a blocking element upon detection at an impact situation in order to restrain the occupant via the seat belt. Modern retractors have been designed having one or more force limiting elements that are structured to allow the spool to rotate and pay out the webbing material of the seat belt upon reaching predetermined force levels between the occupant and seat belt. In this manner, the restraint force imposed on the occupant can be limited in a controlled manner, thereby providing a certain load limitation characteristics. Recently, retractors have also been designed to include a pretensioner operatively coupled to the spool for taking up the seat belt and eliminating slack when a potential impact event is detected.

Despite these and other improvements to automobile restraint systems, the potential exists for load limitation disturbances, such as so-called locking dip, during transition of spool torque load between the pretensioner and the blocking element of the retractor. Locking dip refers to a limited amount of webbing extraction from the retractor in an impact situation before the retractor locking mechanism is fully engaged. Locking dip is undesirable since it permits forward movement of the occupant without effecting energy absorbing forces. Accordingly, there exists a need to provide a retractor having a pretensioner that minimizes or eliminates such load limitation disturbances.

BRIEF SUMMARY OF THE INVENTION

According to one embodiment constructed in accordance with the teachings of the present invention, a retractor having a pretensioner is provided that minimizes or eliminates load limitation disturbances to provide a synchronized and smooth transition between the different structures that resist or block the rotation of the spool. Specifically, the pretensioner initially resists rotation of the spool, and then the blocking element of the retractor takes over to resist rotation of the spool. Additionally, the retractor does not require any additional package width to accomplish the foregoing.

Generally, the retractor includes a spool receiving a portion of the seat belt. A first force limiting element is connected to the spool, and a locking mechanism is operatively connected to the spool through the first force limiting element. A second force limiting element is connected to the spool, and a pretensioner has a drive mechanism that is operatively connected to the spool through the second force limiting element. A clutch is positioned between the second force limiting element and the drive mechanism for controlling force transmission between the spool and the drive mechanism of the pretensioner. The clutch disconnects the drive mechanism from the second force limiting element upon relative rotation between the drive mechanism and the spool.

According to more detailed aspects, the clutch includes a clutch lever positioned to be driven by the spool and a clutch palm connected to the clutch lever. The clutch palm engages the drive mechanism, and the relative rotation between the drive mechanism and the spool causes the clutch palm to disengage the drive mechanism. The clutch lever and clutch palm are rigidly connected such that rotation of the clutch lever affects rotation of the clutch palm for disengagement of the drive mechanism. Preferably, the drive mechanism includes a pinion having an internal bore defining a shoulder positioned to engage the clutch palm. The spool preferably includes a channel to which the clutch lever extends, the clutch lever and channel extending radially. The clutch palm preferably rotates about 5 to 10 degrees before disengagement with the drive mechanism.

A method is also provided for restraining an occupant of an automobile using the retractor described above. The method generally includes the steps of providing the retractor having a pretensioner and clutch (as described above), activating the drive mechanism of the pretensioner to rotate the spool and wind up the seat belt, blocking the rotation of the drive mechanism of the pretensioner, and activating the locking mechanism to resist rotation of the spool through the first force limiting element. During the step of activating the locking mechanism, a small rotation of the spool to pay out the seat belt is needed to engage the locking mechanism with the first force limiting element. This small rotation of the spool drives the clutch lever and rotates the clutch palm to disengage the drive mechanism from the second force limiting element.

BRIEF DESCRIPTION OF THE DRAWINGS

The accompanying drawings incorporated in and forming a part of the specification illustrate several aspects of the present invention, and together with the description serve to explain the principles of the invention. In the drawings.

DETAILED DESCRIPTION OF THE INVENTION

Figure 1:
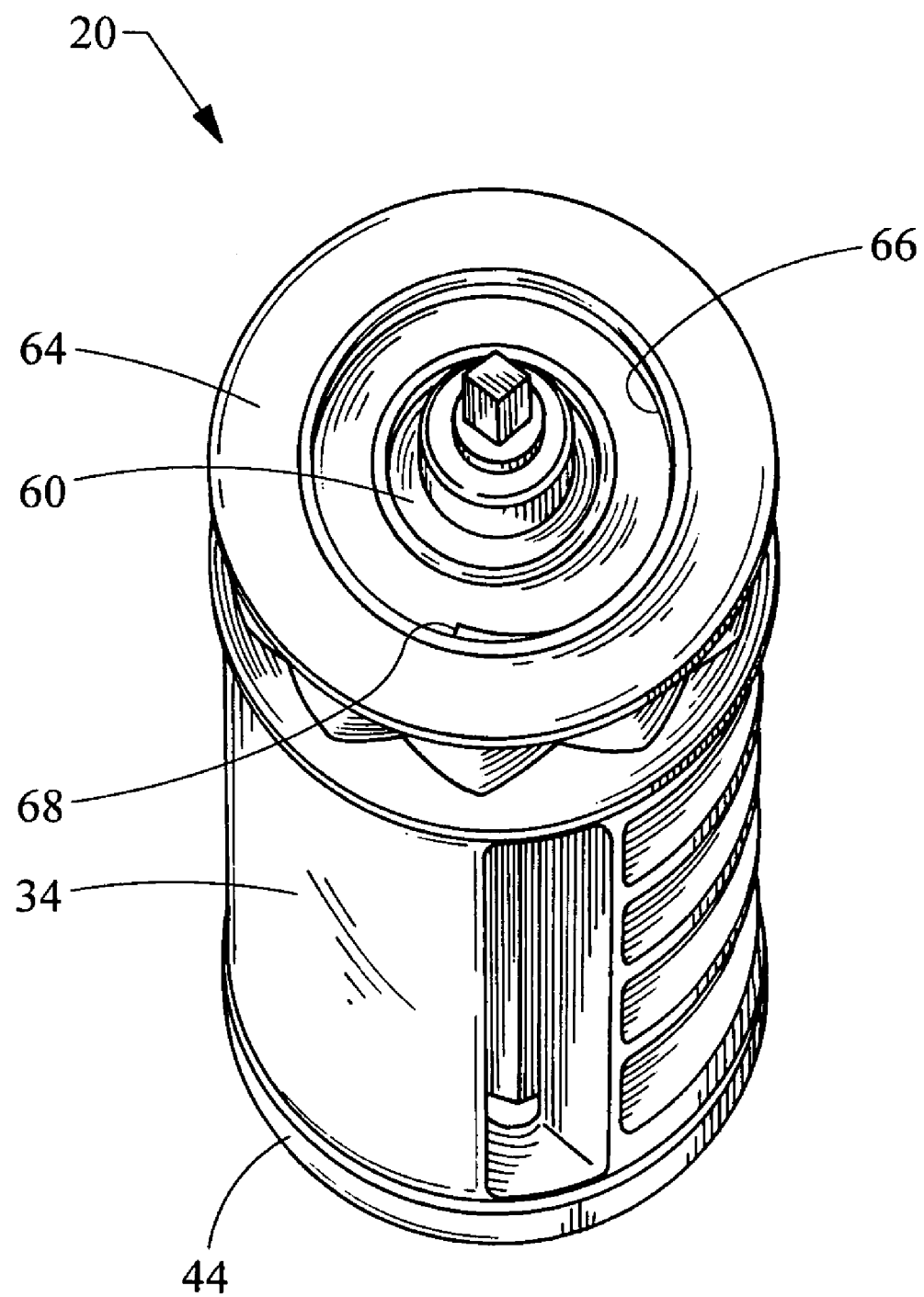
FIG. 1 is a perspective view of a retractor constructed in accordance with the teachings of the present invention.
Figure 2:
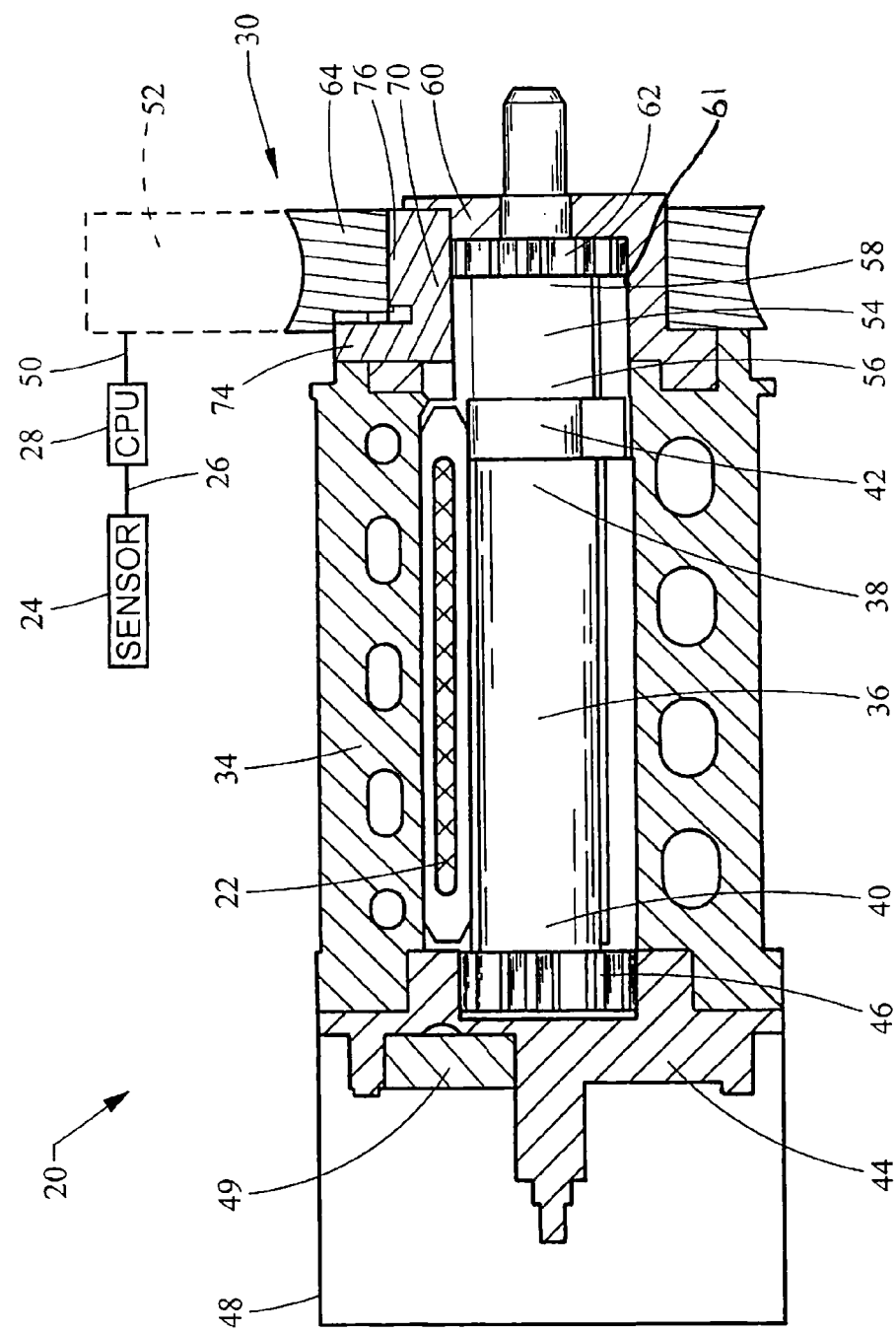
FIG. 2 is a cross-sectional view of the retractor depicted in FIG. 1.

Turning now to the figures, FIGS. 1 and 2 depict a cross-sectional view of a spool assembly 20 for a retractor constructed in accordance with the teachings of the present invention. The spool assembly 20 is adapted for an automobile having a seat belt 22 restraining an occupant (not shown). As is known in the art, the vehicle includes an impact sensor 24 sending a signal 26 indicative of a potential impact event such as a crash event. Any impact sensor that is or will be known to those skilled in the art may be readily employed in conjunction with the spool assembly 20 of the present invention. An electronic control unit 28 such as a central processing unit (CPU) or controller receives the signal 26 and directs the vehicle's response to the same. Generally, the spool assembly 20 includes a pretensioner 30 formed with the spool assembly 20, as will be discussed in greater detail herein.

As is known in the art, during normal use the spool assembly 20 is used to wind up the seat belt 22 about a spool 34. The spool 34 is coupled to a first force limiting element 36, which preferably comprises a torsion rod 36 or torque bar, as is also known in the art. It will be recognized that other types of force limiting elements other than torsion rods may be employed in conjunction with the present invention, including sleeves, rings or tubes. The first force limiting element 36 generally includes a first end 38 and a second end 40. The first end 38 is connected to the spool 34 via a coupling 42, while the second end 40 is connected to a profiled head 44 via another coupling 46. Preferably, the coupling 42 is constructed as a low-profile spline as disclosed in U.S. patent application Ser. No. 11/008,308 filed Dec. 9, 2004, the disclosure of which is incorporated herein by reference in its entirety.

The spool assembly 20 further includes an end assembly 48 which includes a locking mechanism having a blocking element 49 that selectively engages the profiled head 44 and second end 40 of torsion rod 36 during an impact event such as a vehicle collision, providing an "emergency locking retractor" function as is well known in the art. That is, the blocking element 49 serves to ground the spool 34 to the retractor frame (not shown). By way of example, the end assembly 48 is preferably of the type disclosed in U.S. Pat. Nos. 6,616,081; 6,012,667; and 5,924,641, the disclosures of which are hereby incorporated by reference in their entirety. Through blocking of the profiled head 44, the spool 34 is prevented from rotating and the occupant is restrained by the seat belt 22. However, the spool assembly 20 and first force limiting element 36 also provide a load limitation function in order to limit the restraint force imposed on the occupant. Upon reaching a predetermined restraint force, the spool 34 will begin to rotate and "pay out" the seat belt 22 by torsional deflection of the first force limiting element 36. That is, upon reaching a predetermined force, the torsion rod 36 will twist to allow some rotation of the spool 34 (as well as coupling 42 and first end 38) relative to the profiled head 44 (and hence relative to coupling 46 and second end 40) which is fixed by the locking mechanism of end assembly 48. In this manner, a load limitation characteristic is provided by the torsion of the first force limiting element 36 to allow limited pay out of the seat belt 22 wound on the spool 34. The load limitation characteristic may be a low load limitation, high load limitation, or may have a degressive profile. Although accomplished in a different manner, U.S. patent application Ser. Nos. 10/968,504, 11/222,411 and 11/222,130 discuss such load limitation characteristics in greater detail, and are incorporated herein by reference in their entirety.

Also shown in FIG. 2, a pretensioner 30 is provided for pretentioning the seat belt 22 through the spool assembly 20. The pretensioner 30 is activated by the electronic control unit 28 via a pretension signal 50. In particular, a drive mechanism 52 is actuated to effectuate rotation of the spool 34 via a second force limiting element 54. A first end 56 of the second force limiting element 54 is connected to the spool 34 via the shared coupling 42, although it will be recognized that the first end 56 may be directly attached to the spool 34 or include its own coupling. The second end 58 of the second force limiting element 54 is connected to an end cap 60 via a coupling 62. The end cap 60 is rotatable relative to the spool 34. A pinion 64 is connected between the end cap 60 and the drive mechanism 52 to transfer force from the drive mechanism 52 to the spool 34.

It will be recognized by those skilled in the art that while the first ends 38, 56 of the first and second force limiting elements 36, 54 are located adjacent each other and are rigidly connected to the spool 34, the second force limiting element 54 and the pretensioner 30 could be connected to the second end 40 of the first force loading element 36, and more specifically connected to the profiled head 44. It will also be recognized that the first and second load limiting elements 36, 54 may be formed out of a single torsion bar wherein the opposing free ends of the bar would be selectively blocked (either via the locking mechanism or the pretensioner drive mechanism 52) to cause load limitation through the force limiting elements 36, 54. Further, the second force limiting element 54 could be a hollow tube which slides around a reduced diameter end of the torsion rod 36 forming the first force limiting element 36.

Figure 3:
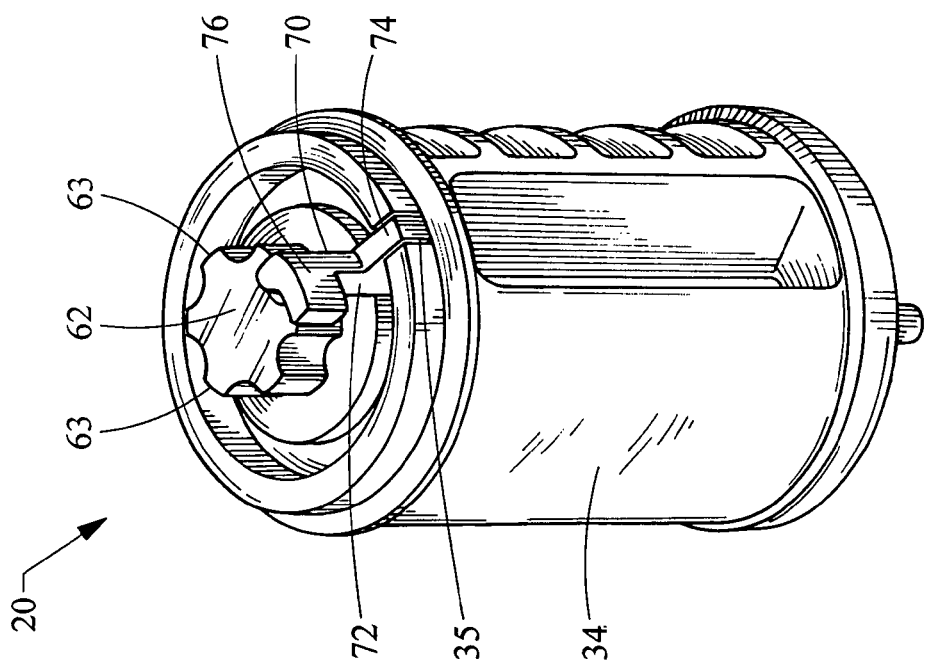
FIG. 3 is perspective view of the retractor depicted in FIG. 1 having the pinion and end cap removed therefrom.
Figure 6:
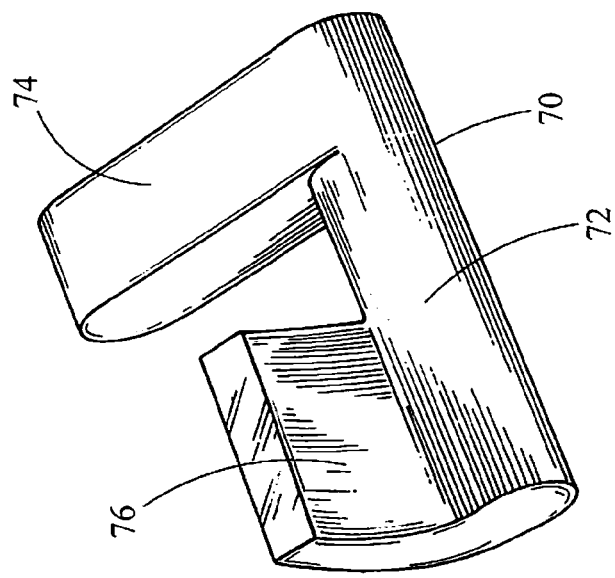
FIG. 6 is a perspective view of a clutch piece forming a portion of the retractor of FIG. 1.

The drive mechanism 52 of the pretensioner 30 may take many forms, such as an electric motor or pyrotechnic drive. One exemplary pretensioner having a pyrotechnic drive is disclosed in U.S. Pat. No. 5,881,962, the disclosure of which is incorporated by reference herein in its entirety. Upon detection of an impact event, the drive mechanism 52 is activated and engages the pinion 64, which in turn operates through the clutch 70 and the second force limiting element 54 to rotate the spool 34 and retract seat belt onto the spool 34. That is, the seat belt is pretensioned to remove slack between the seat belt 22 and the occupant. Then, the drive mechanism 52 of the pretensioner 30 is blocked in order to block further rotation of the spool 34, including protraction or "paying out" of the seat belt 22. The pretensioner 30 may be blocked by maintaining the pressure of the pyrotechnic charge, and/or by a separate blocking element, such as is disclosed in U.S. patent application Ser. No. 11/222,411, filed Sep. 8, 2005 now U.S. Pat. No. 7,581,757 herewith the disclosure of which is incorporated herein by reference in its entirety To disconnect the pretensioner 30 and its drive mechanism 52 from the spool 34, a clutch 70 is provided and is shown in detail in FIGS. 2-5. As best seen in FIG. 6, the clutch 70 generally includes a clutch body 72 interconnecting a clutch lever 74 at one end with a clutch palm 76 at its opposing end. As shown in FIG. 3, the clutch body 72 is generally aligned with a rotational axis of the spool 34, and is positioned between adjacent teeth 63 of the second coupling 62. The clutch lever 74 extends radially outwardly and extends through a channel 35 formed in the spool 34. As such, the clutch lever 74 is positioned to be engaged and driven by the spool 34 when it does not rotate therewith.

Figure 4:
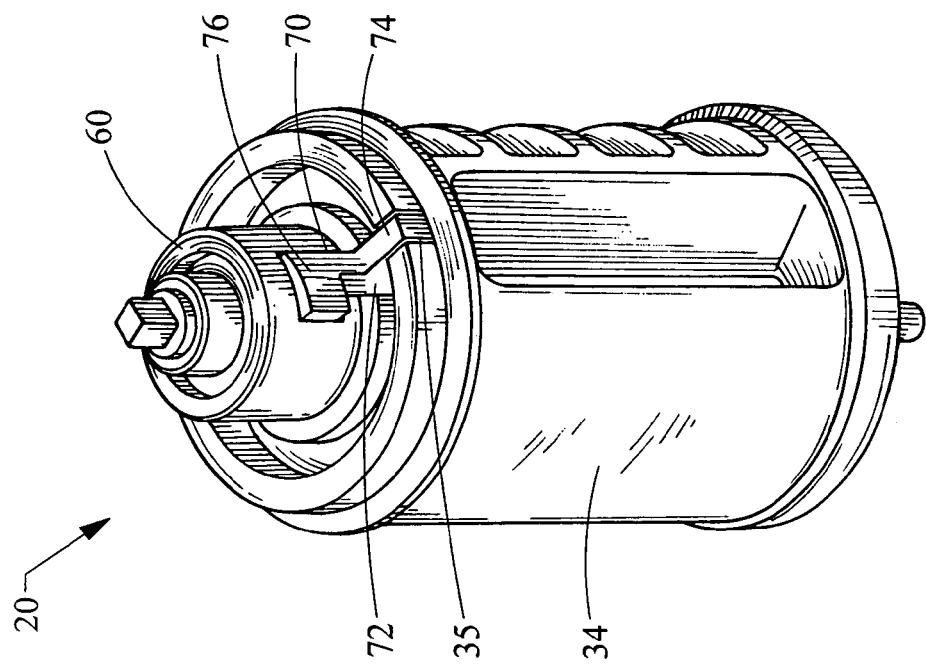
FIG. 4 is a perspective view similar to FIG. 3, having the pinion removed.
Figure 7:
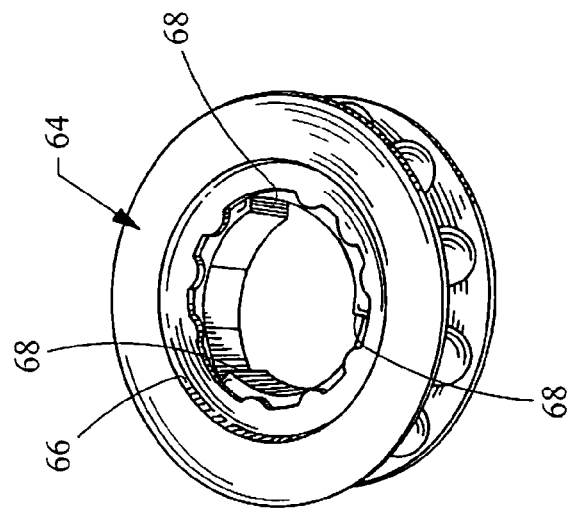
FIG. 7 is a perspective view of a pinion forming a portion of the retractor of FIG. 1.
Figure 5:
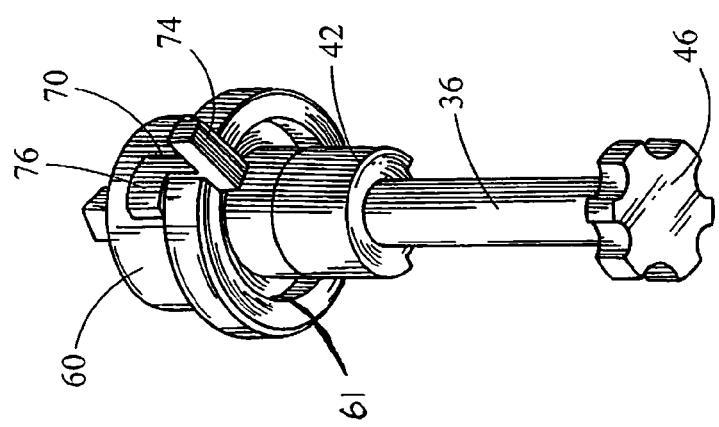
FIG. 5 is a perspective view similar to FIGS. 3 and 4 having the pinion and spool removed.

As shown in FIGS. 4 and 5, the end cap 60 is fitted over the coupling 62 and includes an opening 61 sized to receive the clutch 70, and namely the clutch body 72 and clutch palm 76. The opening 61 is sized and positioned to permit rotation of the clutch 70. As best seen in FIGS. 1 and 7, the pinion 64 includes an internal bore 66 which is sized to receive the end cap 60. The internal bore 66 defines at least one shoulder 68 which engages the clutch palm 76. In this manner, the driving mechanism 52 may rotate the pinion 64, and in turn the pinion 64 rotates the end cap 60 (and hence the second force limiting element 54 and the spool 34) through the clutch 70.

As noted above, after activation of the pretensioner 30, the pretensioner 30 and its driven pinion 64 are blocked to prevent protraction or "pay out" of the seat belt 22. However, some limited protraction of the seat belt 22 is provided by the loading of the second force limiting element 54, and in fact is needed to permit the blocking element 49 of the end assembly 48 to engage the profiled head 44 and fix the second end 40 of the first load limiting element 36. Accordingly, a relative rotation between the spool 34 and the pinion 64 is induced, whereby the spool 34 will drive the clutch lever 74 to rotate the clutch 70 about the axis of clutch body 72. The rotation of clutch 70 causes the clutch palm 76 to rotate out of engagement with the shoulder 68 of the pinion 64, thereby disconnecting the pinion 64 from the end cap 60, second force limiting element 54 and spool 34. The clutch palm 76 rotates about 5 to 10 degrees before disengagement with the drive mechanism, although the degree of rotation can be tuned for any particular application and includes amounts outside of this range.

Notably, because this relative rotation between the drive mechanism 52 (particularly its pinion 64) and the spool 34 coincides with the small rotation of the spool 34 to permit the blocking element 49 of end assembly 48 to engage the profiled head 44, a synchronized and smooth transition is provided between the structures resisting rotation of the spool 34. That is, initially the blocking of retractor pretensioner 30 will restrict the rotation of the spool 34 through the second force limiting element 54, and then activation of the end assembly 48 to restrict rotation of the spool 34 through the blocking element 49 and first force limiting element 36. This causes the relative rotation between the spool 34 and drive mechanism 52, thereby disconnecting these elements via the clutch 70 and providing load limitation through only the first force limiting element 36.

Accordingly, it will be recognized by those skilled in the art that the spool assembly 20 of the present invention has a clutch 70 which automatically disconnects the pretensioner 30 and its drive mechanism 52 from the spool 34 upon activation of the end assembly 48 and blocking of the profiled head 44 through blocking element 49. In fact, any loading of the second force limiting element 54 presents a relative rotation between the spool 34 and drive mechanism 52 (namely its pinion 64) causing disengagement of the clutch 70. As such, the spool assembly 20 will provide a synchronized transition between the pretensioner 30 and the locking end assembly 48 to minimize of element load limitation disturbances between the occupant and seat belt 22.

Further, the spool assembly 20 reduces or eliminates "locking dip", which as used in the industry describes the phenomena of loss of belt load during locking of the retractor, which can occur here when the torque load is transferred from the pretensioner to the blocking element which blocks the profiled head to activate the force limiting element. By activating the pretensioner, and maintaining the activation of the second force limiting element until the first force limiting element is activated through blocking of the tread head, "locking dip" is substantially eliminated.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. A retractor for a seat belt restraining system for restraining an occupant of an automobile having a sensor detecting a potential impact event, the retractor comprising:
   a spool receiving a portion of the seat belt;
   a first force limiting element connected to the spool;
   a locking mechanism operatively connected to the spool through the first force limiting element, the locking mechanism including a blocking element for engaging the first force limiting element and resisting rotation of the spool, the blocking element engaging the first force limiting element upon a small rotation of the spool to pay out seatbelt;
   a second force limiting element connected to the spool;
   a pretensioner having a drive mechanism operatively connected to the spool through the second force limiting element such that activation of the pretensioner rotates the spool to wind-up the seatbelt when connected through the second force limiting element; and
   a clutch positioned between the spool and the drive mechanism for controlling force transmission between the spool and the drive mechanism, the clutch selectively engaging the drive mechanism, relative rotation between the drive mechanism and the spool actuating the clutch to disconnect the drive mechanism from the second force limiting element.

2. The retractor of claim 1, wherein the clutch includes a clutch lever engaged with and driven by the spool.

3. The retractor of claim 2, wherein the clutch includes a clutch palm connected to the clutch lever, the clutch palm selectively engaging the drive mechanism, and wherein the relative rotation between the drive mechanism and spool causes the clutch palm to disengage the drive mechanism.

4. The retractor of claim 3, wherein the clutch lever and clutch palm are rigidly connected, and wherein the relative rotation between the drive mechanism and spool rotates the clutch lever to effect rotation of the clutch palm for disengagement of the drive mechanism.

5. The retractor of claim 4, wherein the clutch palm rotates about 5 to 10 degrees before disengagement with the drive mechanism.

6. The retractor of claim 3, wherein the drive mechanism includes a pinion rotated upon activation of the drive mechanism, and wherein the clutch palm selectively engages the pinion.

7. The retractor of claim 6, wherein the pinion includes an interior bore, the interior bore defining a shoulder positioned to engage the clutch palm.

8. The retractor of claim 3, wherein the clutch includes a clutch body interconnecting the clutch lever and the clutch palm.

9. The retractor of claim 8, wherein the second force limiting element includes a toothed coupling connecting the second force limiting element to the end cap, and wherein the clutch body is received between adjacent teeth of the coupling.

10. The retractor of claim 8, wherein the clutch body defines a pivot axis of the clutch, and wherein the pivot axis is parallel a rotational axis of the spool.

11. The retractor of claim 3, wherein the clutch palm is longitudinally spaced away from the clutch lever.

12. The retractor of claim 2, wherein the spool includes a channel, and wherein clutch lever extends through the channel.

13. The retractor of claim 12, wherein the channel and clutch lever extend radially.

14. The retractor of claim 2, wherein the clutch lever is connected to the spool for rotation therewith in both the retraction and protraction directions.

15. The retractor of claim 1, further comprising an end cap fixedly connected to the second force limiting element, the end cap including an opening sized to receive the clutch and permit rotation of the clutch.

16. The retractor of claim 1, wherein the small rotation of the spool to pay out webbing and cause engagement of the spool and blocking element effects disengagement of the drive mechanism and spool.

17. A method for restraining an occupant of an automobile having seat belt securing the occupant and a sensor detecting a potential impact event, the method comprising:
  providing a retractor having a pretensioner, a spool, a first force limiting element, a second force limiting element, and a locking mechanism, the spool receiving a portion of the seat belt, the first force limiting element operatively connecting the spool and locking mechanism, the pretensioner having a drive mechanism, the second force limiting element operatively linking the spool and drive mechanism;
  providing a clutch positioned between the second force limiting element and the drive mechanism for controlling force transmission between the spool and the drive mechanism, the clutch including a clutch lever positioned to be driven by the spool and a clutch palm for engaging the drive mechanism;
  activating the drive mechanism of the pretensioner to rotate the spool and wind up the seat belt;
  blocking the rotation of the drive mechanism of the pretensioner; and
  activating the locking mechanism to resist rotation of the spool through the first force limiting element, the locking mechanism including a blocking element fixing an end of the first force limiting element upon a small rotation of the spool to pay out the seat belt, the small rotation of the spool driving the clutch lever and rotating the clutch palm to disengage the drive mechanism from the second force limiting element.

18. The method of claim 17, wherein the second force limiting element is loaded to permit the small rotation of the spool and the blocking element to fix an end of the first force limiting element.

19. The method of claim 17, wherein the second force limiting element and pretensioner do not resist rotation of the spool upon activation of the clutch.

* * * * *